United States Patent
Stachura et al.

(10) Patent No.: US 6,915,424 B1
(45) Date of Patent: Jul. 5, 2005

(54) METHOD FOR THEFT DETECTION AND NOTIFICATION VIA A NETWORK

(75) Inventors: Thomas L. Stachura, Portland, OR (US); Anil Vasudevan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1061 days.

(21) Appl. No.: 09/586,651

(22) Filed: Jun. 1, 2000

(51) Int. Cl.[7] .......................... G06F 12/16; G06F 17/60
(52) U.S. Cl. ..................... 713/161; 713/155; 713/165; 705/22; 705/28; 709/226; 709/229
(58) Field of Search ................................ 713/153, 155, 713/160, 161, 162, 165, 201, 202; 705/22, 28, 67, 79; 709/223, 224, 225, 226, 229, 246

(56) References Cited

U.S. PATENT DOCUMENTS

| 4,754,428 A | * | 6/1988 | Schultz et al. ............. 709/246 |
| 5,638,446 A | * | 6/1997 | Rubin ......................... 705/51 |
| 5,884,312 A | * | 3/1999 | Dustan et al. ................ 707/10 |

FOREIGN PATENT DOCUMENTS

JP          09-282263 A  * 10/1997  ........... G06F/13/14

OTHER PUBLICATIONS

Iijima et al., JP 09-282263 A, "Electronic Equipment and Identification Information," Oct. 31, 1997, Japan Patent Office, Computer Translation into English. Retrieved from the Internet:<URL: http://www.ipdl.jpo.go.jp/homepg_e.ipdl>.*

* cited by examiner

Primary Examiner—Justin T. Darrow
(74) Attorney, Agent, or Firm—Blakely, Sokoloff, Taylor & Zafman LLP

(57) ABSTRACT

A method and apparatus for preventing theft of an organization property is disclosed. In one embodiment, the method and apparatus authenticates the ownership of an organization property by comparing stored identification information with collected identification information of the organization property. Then the method and apparatus transmits multiple types of network packets containing such authentication result to organization servers via a network.

24 Claims, 6 Drawing Sheets

METHOD FOR THEFT DETECTION AND NOTIFICATION VIA A NETWORK

FIELD OF THE INVENTION

This invention relates to technologies in theft detection and notification generally and particularly to technologies in preventing theft of and tracking properties of an organization.

BACKGROUND OF THE INVENTION

Theft of information processing apparatus, such as a computer system, and its components, such as its processors, add-on cards, etc., continue to plague businesses today. Although many theft prevention measures exist today, none provides a cost-effective mechanism for an organization to both deter the theft of its properties and to track their whereabouts when stolen.

For example, one conventional mechanism involves physically chaining an information processing apparatus, such as a notebook computer, to fixtures of an organization. Specifically, each notebook computer has an associated docking station. Each docking station has a locking mechanism to secure the notebook computer to the station. Then a wire lock fastens the station to a company fixture, such as a desk. One shortcoming of this method is its inability to relocate the notebook computer once it leaves the physical premises of the organization. Also, the method is likely to be an expensive proposition for an organization with a large number of notebook computers. First, the organization needs to purchase a docking station and an appropriate wire lock for each notebook computer that it owns. Second, the organization may also need to hire additional resources to properly deploy such a theft preventive mechanism throughout the organization.

Another common theft prevention mechanism involves attaching theft detection tags to the properties of an organization. Usually, only authorized personnel of the organization have access to special tools that can easily remove or desensitize these tags. In addition, the organization strategically places sensing devices near the exits of its physical premises. Thus, if a property of the organization, having an attached and still sensitized tag, is brought near or past the sensing device, the sensing device alerts the security personnel of the organization. However, this method is susceptible to individuals removing or desensitizing the theft detection tags, and lacks any recovery mechanism after the property leaves the organization's physical premises.

Therefore, an improved method and apparatus is needed to address the discussed issues and still provide a cost-effective theft detection and notification solution.

SUMMARY OF THE INVENTION

A method and apparatus for preventing theft of an organization property is disclosed.

In one embodiment, the method and apparatus authenticates the ownership of an organization property by comparing stored identification information with collected identification information of the organization property. Then the method and apparatus transmits multiple types of network packets containing such authentication result to organization servers via a network.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and an apparatus for preventing theft of an organization property is disclosed. In the following description, numerous specific details such as theft scenario 1 and 2, processor P, validation system V and notebook computer N are set forth in order to provide a thorough understanding of the present invention. However, it will be apparent to one of ordinary skill in the art that the invention may be practiced without these particular details. In other instances, well-known elements and theories, such as the Internet, intranet, client-server architecture, Transmission Control Protocol/Internet Protocol (hereinafter TCP/IP), database technology, network packets, etc. have not been discussed in special details in order to avoid obscuring the present invention.

Moreover, the term "organization" broadly refers to a number of persons or groups united for a particular purpose. Some examples of an organization are, but not limited to, a family, a group, a department, a division or a company. Any property owned by an organization is referred as an "organization property". Also throughout the following discussions, the terms, "packet" and "network packet", are used interchangeably. Additionally, the illustrative examples of the present invention refer to some other noteworthy terms. One such term is an Internet Protocol address (hereinafter IP address), which refers to an identifier for a computer or device on a TCP/IP network. Another term "subnet" refers to a portion of a network that shares a common address component. In TCP/IP context, two devices are considered to be on the same subnet when their IP addresses have the same prefixes. Yet another term "firewall systems" refers to systems designed to prevent unauthorized users from accessing private networks. Finally, a machine readable medium refers to, but is not limited to, a storage device, a memory device, a carrier wave, etc.

Figure 1A:
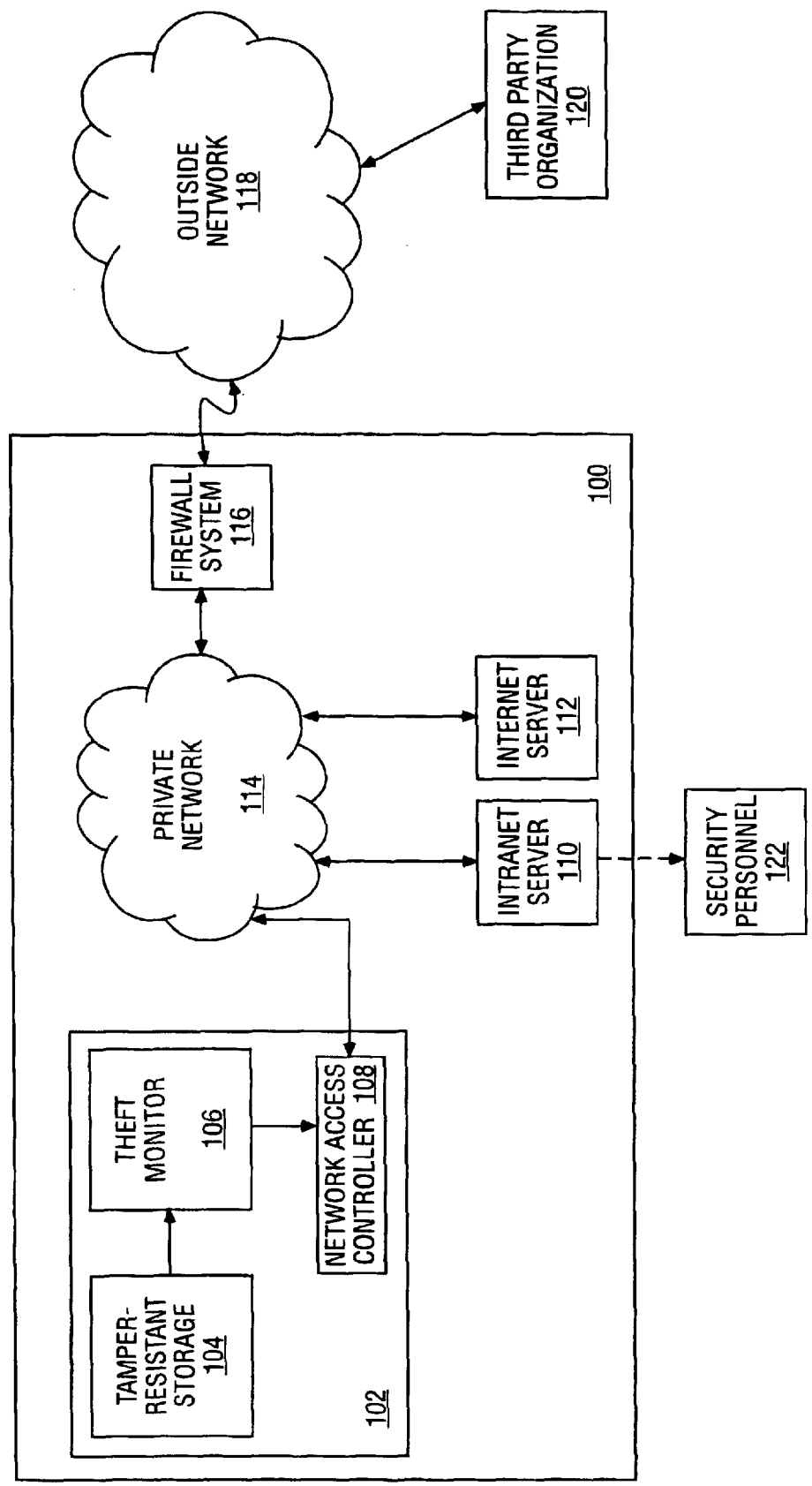
FIG. 1(a) illustrates a general block diagram of one embodiment of a theft prevention system in one network configuration.

FIG. 1(a) illustrates a general block diagram of one embodiment of a theft prevention system that monitors organization property 102. Organization property 102 can be, but is not limited to, a desktop computer system, a notebook computer system or any electronic system owned by organization 100. The system utilizes one network configuration, which includes private network 114, firewall system 116 and outside network 118. Private network 114, as an internal network of organization 100, may operate any number of well-known or proprietary network protocols. Together with firewall system 116, private network 114 is most likely accessible only to authorized personnel of organization 100. On the other hand, outside network 118 connects organization 100 to other organizations such as third party organization 120. One example of outside network 118 is the Internet.

Moreover, this embodiment of the theft prevention system includes, but is not limited to, tamper-resistant storage 104, theft monitor 106, intranet server 110 and Internet server 112. Tamper-resistant storage 104 refers to a storage medium that is difficult for unauthorized individuals to make modifications to. For instance, organization 100 may program certain information in storage devices such as a flash memory or a one-time programmable memory so that the stored information is difficult to tamper with. Alternatively, tamper-resistant storage 104 may also refer to an ordinary storage device, such as a disk driver, where one ordinarily skilled in the art opts to encrypt and store sensitive information in obscure locations of the device.

Tamper-resistant storage 104 typically stores identification information that pertains to organization 100's ownership of organization property 102. Subsequent discussions refer to this identification information as "stored identification information". Some examples of the stored identification information are, but not limited to, an IP address, subnet information, serial numbers, device identification numbers, network addresses of intranet server 110 and Internet server 112, etc.

One embodiment of theft monitor 106 accesses tamper-resistant storage 104 and applies the stored identification information to authenticate the ownership of organization property 102. Specifically, theft monitor 106 first collects identification information from organization property 102. Subsequent discussions refer to this information as "collected identification information". The collected identification information not only includes the same type of information as the stored identification information, but may also comprise further information reflective of the identity of organization property 102's user or the location of organization property 102. Then theft monitor 106 compares the two types of identification information and transmits the comparison result and any other relevant identification information to intranet server 110 or Internet server 112. It is important to note that one ordinarily skilled in the art may implement the described functionality of theft monitor 106 either in hardware or in software without exceeding the scope of the present invention.

Figure 1B:
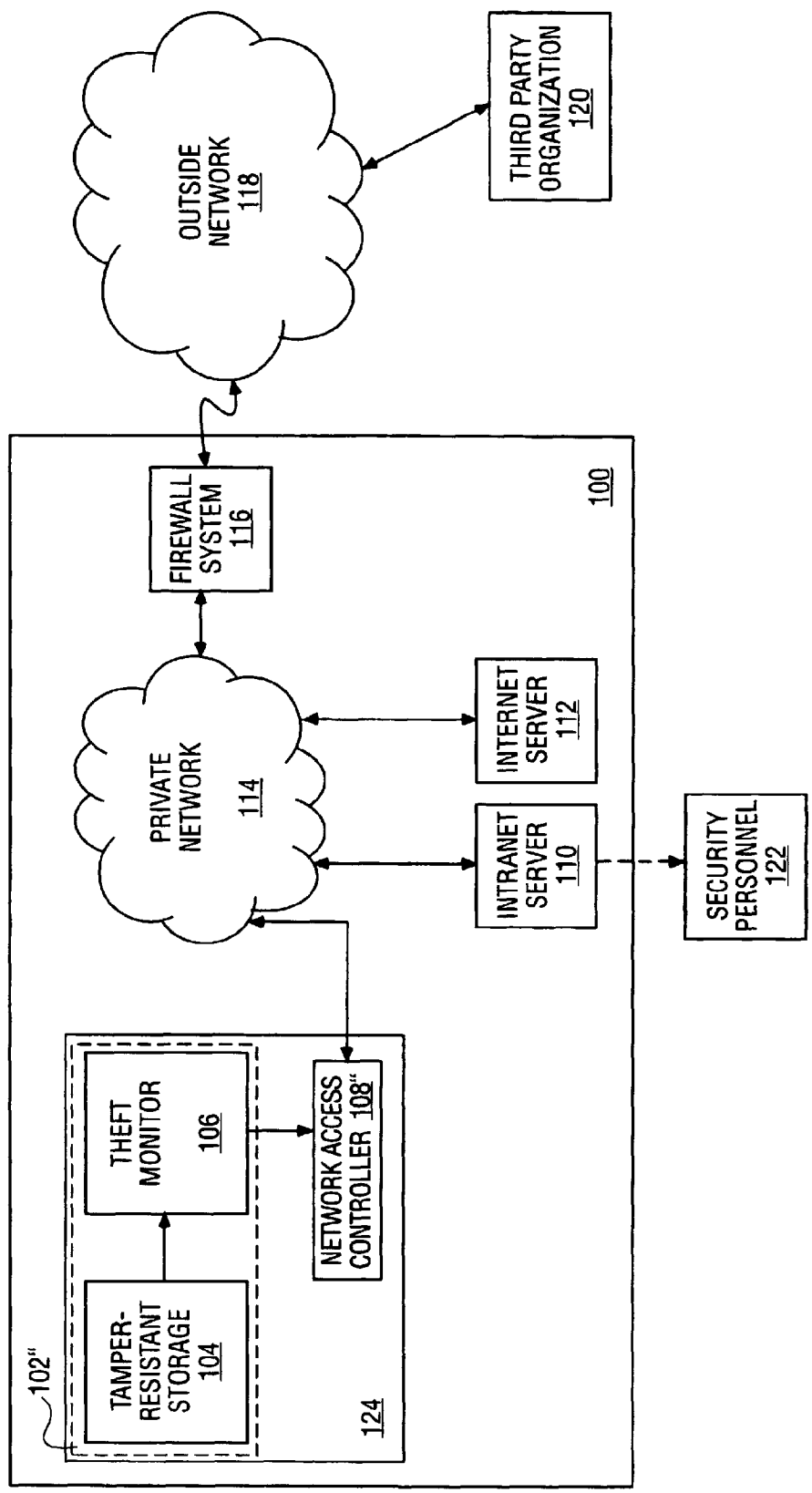
FIG. 1(b) illustrates a general block diagram of another embodiment of a theft prevention system in one network configuration.

Aside from this described system-level monitoring, another embodiment of a theft prevention system is capable of conducting component-level monitoring as shown in FIG. 1(b). In particular, still utilizing tamper-resistant storage 104, theft monitor 106, intranet server 110 and Internet server 112, this system mainly monitors organization property 102", which represents components of a system. For instance, organization property 102" can be, but is not limited to, a processor, an add-in card, etc. of electronic system 124. Also, theft monitor 106 in FIG. 1(b) mainly derives the collected identification information from electronic system 124.

As shown in both FIG. 1(a) and FIG. 1(b), theft monitor 106 communicates with intranet server 110 and Internet server 112 through network access controller 108 and 108", respectively. One ordinarily skilled in the art should note that these network access controllers provide connectivity services for various types of communication mediums, such as copper wire, lasers, microwaves, communication satellites, etc.

Figure 2:
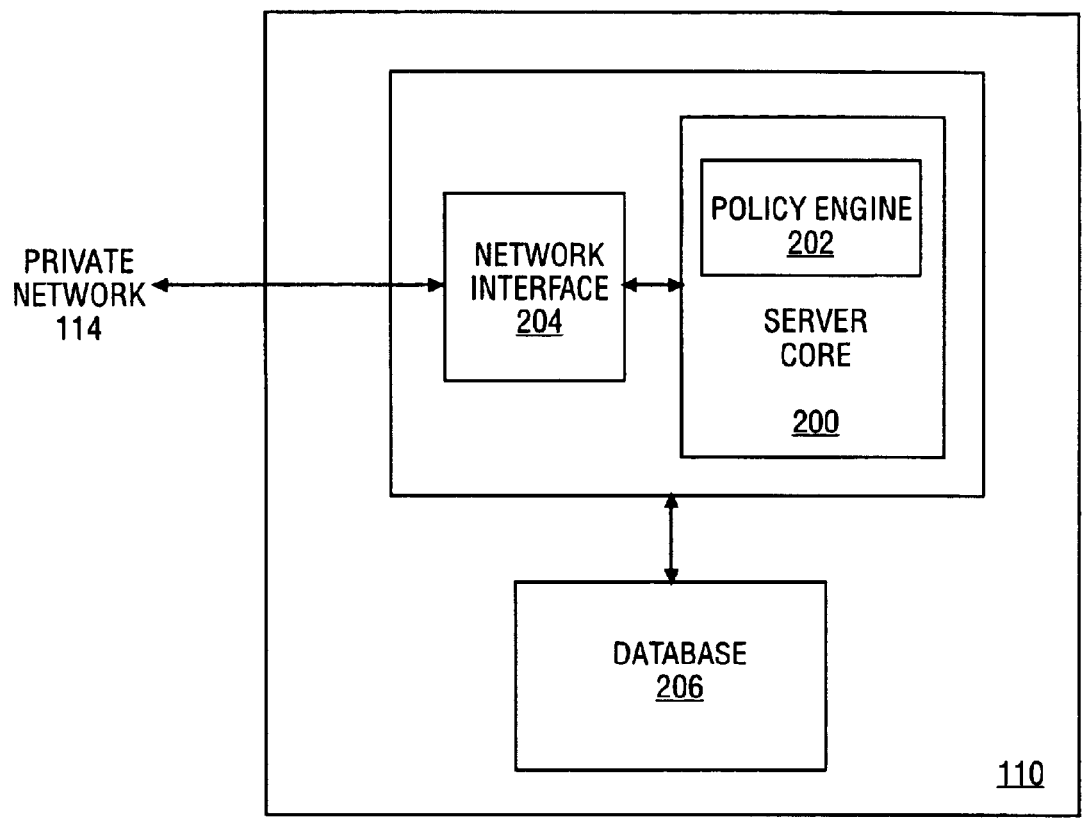
FIG. 2 demonstrates a general block diagram of an intranet server.

Furthermore, intranet server 110 refers to a server system that provides services to client systems, such as organization property 102 and electronic system 124, that are connected to private network 114. FIG. 2 illustrates a general block diagram of one intranet server 110. Particularly, intranet server 110 receives and transmits information from and to private network 114 through network interface 204. Server core 200 fields requests from client systems connected to private network 114 and invokes appropriate programs residing on the server system to respond to such requests. Policy engine 202, which can be a part of or an extension of server core 200, analyzes information from theft monitor 106, attempts to establish whether theft has occurred and provides recovery guidelines for organization 100 to follow. Policy engine 202 also accesses inventory information, scheduling information, or any relevant information from database 206 to support its decisions.

Although Internet server 112 is also a server system, unlike intranet server 110, it avails some of its services to entities outside of firewall system 116. For instance, Internet server 112 may directly receive and respond to email messages from third party organization 120. Thus, when organization property 102 or 102" detaches from private network 114 and as a result loses contact with intranet server 110, one embodiment of a theft prevention system relies on Internet server 112 to relocate the property. More particularly, Internet server 112 listens for information from theft monitor 106 of the property on outside network 118. Subsequent sections will present examples to elaborate on these servers' roles in a theft prevention system.

Figure 3:
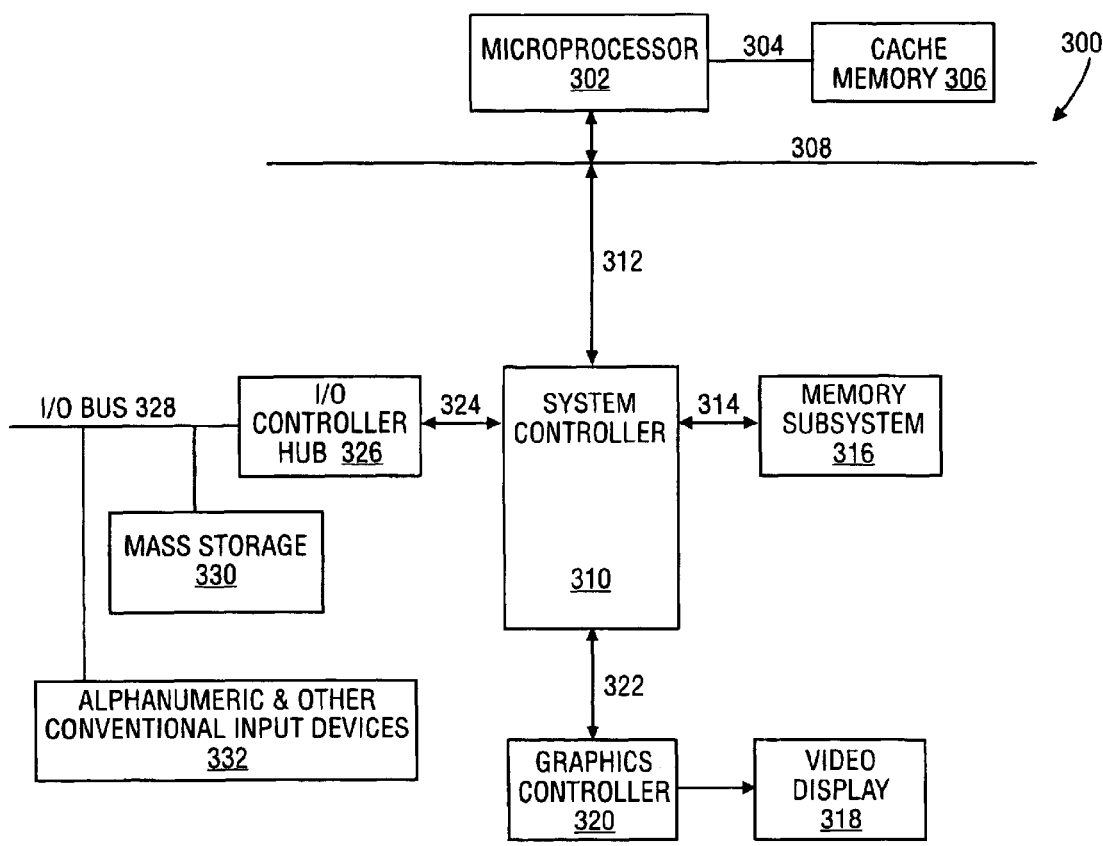
FIG. 3 illustrates a general purpose computer system.

Some examples of these discussed server systems are, but not limited to, add-in circuit boards, standalone electronic apparatuses and general-purpose computer systems. A general-purpose computer system 300 is illustrated in FIG. 3.

The general-purpose computer system architecture comprises microprocessor 302 and cache memory 306 coupled to each other through processor bus 304. Sample computer system 300 also includes high performance system bus 308 and standard I/O bus 328. Coupled to high performance system bus 308 are microprocessor 302 and system controller 310. Additionally, system controller 310 is coupled to memory subsystem 316 through channel 314, is coupled to I/O controller hub 326 through link 324 and is coupled to graphics controller 320 through interface 322. Coupled to graphics controller is video display 318. Coupled to standard I/O bus 328 are I/O controller hub 326, mass storage 330 and alphanumeric input device or other conventional input device 332.

These elements perform their conventional functions well known in the art. Moreover, it should have been apparent to one ordinarily skilled in the art that computer system 300 could be designed with multiple microprocessors 302 and may have more components than that which is shown. Also, mass storage 320 may be used to provide permanent storage for the executable instructions of the theft prevention system in one embodiment, whereas memory subsystem 316 may be used to temporarily store the executable instructions during execution by microprocessor 302. In some configurations, mass storage 330 may contain database 206 shown in FIG. 2.

Operation Of One Embodiment Of a Theft Prevention System

One embodiment of a theft prevention system handles at least two theft scenarios. Theft scenario 1 involves an individual stealing processor P off validation system V from a quality assurance lab of organization 100. Some assumptions for the purposes of discussing this scenario are: 1) processor P should remain in contact with validation system V at all times unless intranet server 110 modifies its policy engine 202; 2) validation system V has at least one device D capable of providing a unique device identification information; and 3) after the perpetrator removes processor P from validation system V, he or she is still physically within premises of organization 100 and has not had opportunities to reinsert processor P in any other systems. Theft scenario 2 involves an individual stealing notebook computer N from organization 100 for his or her personal use. The assumptions for this scenario are: 1) notebook computer N belongs to a pre-assigned subnet and can assume a range of pre-assigned IP addresses; and 2) the perpetrator uses notebook computer N to logon to the Internet through his or her Internet Service Provider (hereinafter ISP).

Figure 4:
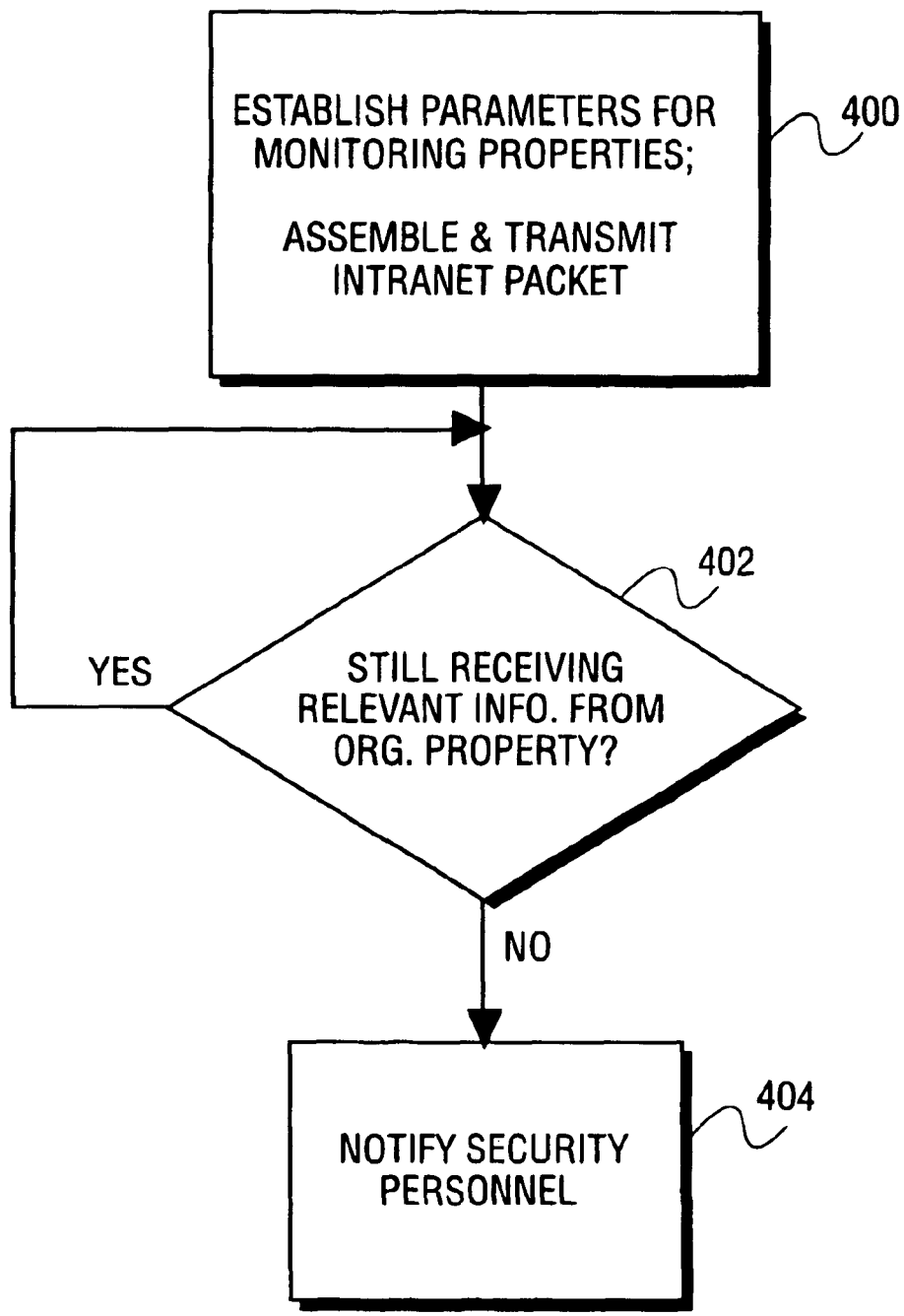
FIG. 4 illustrates a flow chart of one process that one embodiment of a theft prevention system follows.

FIG. 4 illustrates a flow chart of one process that one embodiment of a theft prevention system follows in response to theft scenario 1. Processor P corresponds to organization property 102" and validation system V to electronic system 124 as shown in FIG. 1(b). In block 400, the theft prevention system establishes a set of parameters for monitoring properties such as processor P. These monitoring parameters may specify, but are not limited to, the amount of time for organization property 102" to remain connected to private network 114 and the type of information exchanges between intranet server 110 and theft monitor 106 of organization property 102". As an illustration, the monitoring parameters may require theft monitor 106 of processor P to transmit or cause to transmit a specifically formatted network packet to intranet server 110 periodically. This network packet contains authentication information related to processor P.

As has been discussed above, authentication of the ownership of processor P can be accomplished by comparing collected identification information and stored identification information relevant to processor P. In one implementation, tamper-resistant storage 104 contains network addresses of intranet server 110 and Internet server 112 and a unique device identification information of device D. Theft monitor 106 sends requests to device D to obtain this identification information. If the collected device identification information does not match the stored one, theft monitor 106 generates a mismatched message that indicates a possible misplacement of processor P. Otherwise, theft monitor 106 generates a matched message.

Then theft monitor 106 proceeds to assemble and transmit an intranet packet with the network address of intranet server 110 as the destination address. Within this packet, theft monitor 106 embeds the matched or mismatched message. In block 402, intranet server 110 parses and analyzes such a network packet. When processor P remains on validation system V, intranet server 110 should observe the matched message in a timely fashion. However, in the event processor P loses contact with validation system V in theft scenario 1, intranet server 110 will not receive the intranet packet from theft monitor 106 within a period of time defined by the previously discussed monitoring parameters. Intranet server 110 thus establishes that theft has occurred and proceeds to alert security personnel 122 shown in FIG. 1(b) in block 404.

Security personnel 122 are typically stationed at entrances or exits of the physical premises of organization 100 and have limited authority to inspect employees' personal belongings. One embodiment of intranet server 110 also has capabilities of identifying a list of employees with access to the lab by accessing employee records in database 206. Intranet server 110 can present the list to security personnel 122 to thus possibly prevent the perpetrator from leaving the premises of organization 100 with processor P.

Figure 5:
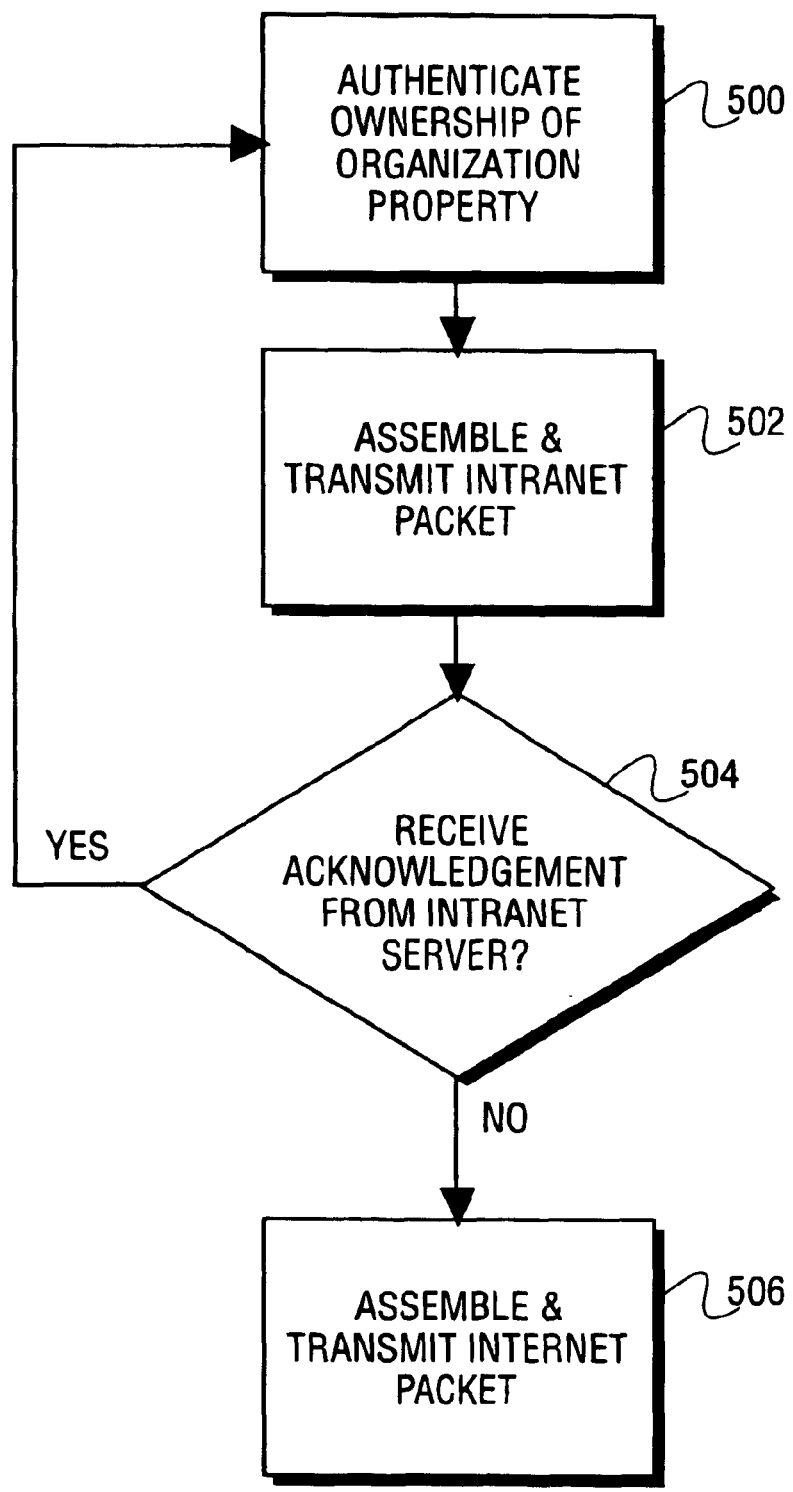
FIG. 5 illustrates a flow chart of one process that one embodiment of a theft monitor follows.

As to theft scenario 2, although the process shown in FIG. 4 is applicable, one embodiment of a theft prevention system involves additional interactions among theft monitor 106, intranet server 110 and Internet server 112. FIG. 5 illustrates a flow chart of one process that theft monitor 106 follows to further demonstrate these interactions. Similar to the authentication process described in theft scenario 1, theft monitor 106 also authenticates the ownership of notebook computer N, which corresponds to organization property 102 as shown in FIG. 1(a), by comparing appropriate collected identification information and stored identification information in block 500.

More specifically, in one implementation, tamper-resistant storage 104 contains network addresses of intranet server 110 and Internet server 112 and a range of IP addresses and subnet information assigned to notebook computer N. Before the perpetrator is able to connect to the Internet through his or her ISP, or third party organization 120 as shown in FIG. 1(a), another IP address has to be assigned to notebook computer N. With that in mind, theft monitor 106 searches through configuration information of N for this newly assigned IP address and collects the search outcome. Theft monitor 106 then compares the collected IP address with the information stored in tamper-resistant storage 104. If the collected IP address neither belongs to the pre-assigned subnet nor falls within the pre-assigned range of IP addresses, theft monitor 106 generates a mismatched message that indicates a possible misplacement of notebook computer N.

Theft monitor 106 also assembles and transmits an intranet packet with the network address of intranet server 110 as the destination address in block 502. Within this packet, theft monitor 106 could embed the mismatched message. In block 504, when intranet server 110 successfully receives the intranet packet, it sends an acknowledgement packet back to theft monitor 106. The acknowledgement packet may instruct theft monitor 106 to continue authenticating the ownership of notebook computer N in a timely manner.

However, because notebook computer N is no longer on private network 114 in theft scenario 2, the intranet packet will not reach intranet server 110. After a certain amount of time has lapsed or after a certain number of attempts have been made, theft monitor assembles and transmits an Internet packet with the network address of Internet server 112 as the destination address in block 506. In the Internet packet, theft monitor 106 may embed information representative of its failure to communicate with intranet server 110 and any relevant information indicative of the location of notebook computer N. Some examples of such relevant information are, but not limited to, the newly assigned IP address, the login name of the user, the name of the ISP, etc. Then theft monitor 106, through network access controller 108, repeatedly transmit these Internet packets to Internet server 112.

Although specific examples have been provided to illustrate the operations of a theft prevention system, one with ordinary skill in the art may implement the illustrated system without all the disclosed details. For example, instead of assembling either the intranet packet or the Internet packet itself, the described theft monitor 106 may instruct network access controller 108 or 108" to assemble the packets. An ordinarily skilled artisan may also further divide or combine the functionality of the discussed components of the theft prevention system and establish other monitoring parameters to monitor properties of an organization than the ones disclosed without exceeding the scope of the present invention.

Thus, a method and apparatus for preventing theft of an organization property has been disclosed. Although a theft prevention system has been described particularly with reference to the figures, it may appear in any number of networked systems. It is further contemplated that many changes and modifications may be made by one of ordinary skill in the art without departing from the spirit and scope of the present invention.

What is claimed is:

1. A method of preventing theft of an organization property, comprising:
   storing first identification information of an organization property;
   collecting second identification information of the organization property;
   comparing the second identification information with the first identification information to generate authentication result; and
   transmitting a plurality of types of network packets containing the authentication result to a plurality of organization servers via a network.

2. The method according to claim 1, wherein comparing the second identification information with the first identification information further comprises:
   retrieving the first identification information and network addresses of the organization servers from a tamper-resistant storage location.

3. The method according to claim 2, wherein transmitting the plurality of types of network packets further comprises:
   assembling the plurality of types of network packets with the network addresses and with information indicative of a current location of the organization property.

4. The method according to claim 3, further comprising:
   assembling and transmitting an intranet network packet to an intranet server; and
   assembling and transmitting an Internet network packet to an Internet server in response to a non-acknowledgement from the intranet server.

5. The method according to claim 2, further comprising:
   retrieving the second identification information from the organization property.

6. The method according to claim 2, further comprising:
   retrieving the second identification information from an electronic system that contains the organization property.

7. The method according to claim 5, wherein the second identification information comprises an Internet Protocol address assigned to the organization property.

8. The method according to claim 6, wherein the second identification information comprises device identification information of the electronic system.

9. A machine readable medium having embodied thereon instructions, which when executed by a machine, causes the machine to perform a method of preventing theft of an organization property, the method comprising:
   storing a first identification information of an organization property;
   collecting a second identification information of the organization property;
   comparing the second identification information with the first identification information to generate an authentication result; and
   transmitting a plurality of types of network packets that are indicative of the authentication result to a plurality of organization servers via a network.

10. The machine readable medium according to claim 9, wherein comparing the second identification information with the first identification information further comprises:
    retrieving the first identification information and network addresses of the organization servers from a tamper-resistant storage location.

11. The machine readable medium according to claim 10, wherein transmitting the plurality of types of network packets further comprises:
    assembling the plurality of types of network packets with the network addresses and information indicative of a current location of the organization property.

12. The machine readable medium according to claim 11, the method further comprising:
    assembling and transmitting an intranet network packet to an intranet server; and
    assembling and transmitting an Internet network packet to an Internet server in response to a non-acknowledgement from the intranet server.

13. The machine readable medium according to claim 10, the method further comprising:
    retrieving the second identification information from the organization property.

14. The machine readable medium according to claim 10, the method further comprising:
    retrieving the second identification information from an electronic system that contains the organization property.

15. The machine readable medium according to claim 13, wherein the second identification information comprises an Internet Protocol address assigned to the organization property.

16. The machine readable medium according to claim 14, wherein the second identification information comprises device identification information of the electronic system.

17. A theft prevention system for detecting theft of an organization property, comprising:
    a plurality of organization servers coupled to a network;
    a tamper-resistant storage location to maintain a first identification information of the organization property and network addresses of the organization servers;
    a theft monitor, coupled to the tramper-resistant storage location, to generate an authentication result by comparing the first identification information with a second identification information of the organization property; and
    a network access controller, coupled to the theft monitor, to transmit a plurality of types of network packets containing the authentication result to the organization servers via the network.

18. The theft prevention system according to claim 17, the theft monitor further to assemble the plurality of types of network packets with the network addresses and with information indicative of a current location of the organization property.

19. The theft prevention system according to claim 18, the theft monitor further:
    to transmits an intranet network packet to an intranet server; and
    in response to a non-acknowledgement from the intranet server, to transmits an Internet network packet to an Internet server.

20. The theft prevention system according to claim 18, the theft monitor further:
    to cause the network access controller to transmit an intranet network packet to an intranet server; and
    in response to a non-acknowledgement from the intranet server, to cause the network access controller to transmit an Internet network packet to an Internet server.

21. The theft prevention system according to claim 17, the theft monitor further to retrieve the collected identification information from the organization property.

22. The theft prevention system according to claim 17, the theft monitor further to retrieve the collected identification information from an electronic system that contains the organization property.

23. The theft prevention system according to claim 21, wherein the second identification information comprises an Internet Protocol address assigned to the organization property.

24. The theft prevention system according to claim 22, wherein the second identification information comprises device identification information of the electronic system. information from an electronic system that contains the organization property.

* * * * *

UNITED STATES PATENT AND TRADEMARK OFFICE
CERTIFICATE OF CORRECTION

PATENT NO. : 6,915,424 B1  
DATED : July 5, 2005  
INVENTOR(S) : Stachura

It is certified that error appears in the above-identified patent and that said Letters Patent is hereby corrected as shown below:

Column 8,  
Line 64, after "systems." delete "information form an electronic system that contains the organization property.".

Signed and Sealed this

Thirtieth Day of August, 2005

JON W. DUDAS  
*Director of the United States Patent and Trademark Office*